US009009657B2

(12) United States Patent
Zhu et al.

(10) Patent No.: US 9,009,657 B2
(45) Date of Patent: Apr. 14, 2015

(54) COMPONENT-ORIENTED ARCHITECTURE FOR WEB MASHUPS

(75) Inventors: Bin Benjamin Zhu, Edina, MN (US); Rui Guo, Beijing (CN); Min Feng, Beijing (CN); Aimin Pan, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1182 days.

(21) Appl. No.: 12/106,300

(22) Filed: Apr. 20, 2008

(65) Prior Publication Data

US 2009/0265760 A1    Oct. 22, 2009

(51) Int. Cl.
*G06F 9/44* (2006.01)
*G06F 21/53* (2013.01)
*H04L 29/06* (2006.01)
*H04L 29/08* (2006.01)

(52) U.S. Cl.
CPC ........ *G06F 21/53* (2013.01); *G06F 2221/2119* (2013.01); *H04L 63/10* (2013.01); *H04L 63/168* (2013.01); *H04L 67/02* (2013.01)

(58) Field of Classification Search
CPC .............................................. G06F 2221/2119
USPC .......................................... 717/107; 715/762
See application file for complete search history.

(56) References Cited

U.S. PATENT DOCUMENTS 4,322,576 A * 3/1982 Miller ............................. 380/29
5,546,584 A * 8/1996 Lundin et al. ................. 719/315
6,536,037 B1 3/2003 Guheen et al.
6,785,653 B1 8/2004 White et al.
6,973,625 B1 12/2005 Lupo et al.
(Continued)

FOREIGN PATENT DOCUMENTS

KR    10-2007-0009517 A    1/2007
KR         10-0700626 B1    3/2007
(Continued)

OTHER PUBLICATIONS

Amulet HTMLCompiler, "Inter-Widget Communication", Dec. 2007, http://web.archive.org/web/20071204004440/http://web.mit.edu/6.115/www/miscfiles/amulet/amulet-help/IWC.htm.*
(Continued)

*Primary Examiner* — Wei Zhen
*Assistant Examiner* — Lanny Ung
(74) *Attorney, Agent, or Firm* — Dan Choi; Judy Yee; Micky Minhas (57) ABSTRACT

A component-oriented web mashup system and method for communicating between component-oriented Web gadgets to facilitate secure Web mashups. Embodiments of the system and method redefine the traditional definition of gadget to mean a Web component having a verifiable controlled communication channel (a CompoWeb gadget). A CompoWeb gadget is created and defined using new HTML tags and global script objects and functions that extend the functions of the browser. CompoWeb gadget content is treated as a component that is isolated from other gadgets and frames by a browser, and only those allowed access can view data and code therein. Called functions of a CompoWeb gadget are run in the callee's environment instead of the caller's environment. This adds security, because all the requesting CompoWeb gadget receives is the run result. Embodiments of the system and method also include delayed binding of CompoWeb gadgets, such that binding is performed at run time.

20 Claims, 6 Drawing Sheets

(56) References Cited

U.S. PATENT DOCUMENTS

| | | | |
|---|---|---|---|
| 7,162,519 | B2 | 1/2007 | Jenkins |
| 7,200,681 | B1 | 4/2007 | Lewin et al. |
| 7,315,826 | B1 | 1/2008 | Guheen et al. |
| 2005/0086587 | A1* | 4/2005 | Balz .............................. 715/505 |
| 2006/0218487 | A1 | 9/2006 | Ross et al. |
| 2006/0218523 | A1* | 9/2006 | Tatsumi et al. ............... 717/106 |
| 2006/0265662 | A1 | 11/2006 | Gertzen |
| 2007/0101291 | A1* | 5/2007 | Forstall et al. ................ 715/805 |

FOREIGN PATENT DOCUMENTS

| | | |
|---|---|---|
| KR | 10-0821051 B1 | 4/2008 |
| KR | 10-2009-0083835 A | 8/2009 |
| WO | 0123976 A2 | 4/2001 |
| WO | 2007-062192 A2 | 5/2007 |

OTHER PUBLICATIONS

AboutCookies.org, "Cookies: Frequently Asked Questions", Mar. 8, 2005, https://web.archive.org/web/20050308164944/http://www.aboutcookies.org/cookiefaq.asp.*

Sriraman, et al., "Component Based Architecture Supplementing Service Oriented Architectures", Sun Microsystems, March, 2005, pp. 1-16.

Gellersen, et al., "Object-Oriented Web Application Development", IEEE Internet Computing, Web Application Development, Jan. • Feb. 1999, pp. 60-68.

Howell, et al., "MashupOS: Operating System Abstractions for Client Mashups", Proceedings of the 11th USENIX workshop on Hot topics in operating systems, Article No. 16, 2007, 7 pages.

Wang, et al., "Protection and Communication Abstractions for Web Browsers in MashupOS", Proceedings of twenty-first ACM SIGOPS symposium on Operating systems principles, ACM Symposium on Operating Systems Principles, SOSP'07, Oct. 14-17, 2007, 15 pages.

James Larus, "Singularity: Rethinking the Software Stack", Microsoft, Nov. 9, 2006, 36 pages.

Jesse Ruderman, "J. Ruderman. The Same Origin Policy", Mozilla, Feb. 13, 2008, 2 pages.

Uramoto, et al., "OpenAjax Security Work Session", Topic Proposal, IBM Research, OpenAjax Security, Mar. 22, 2007, 15 pages.

"Adobe Flash Player 9 security white paper", ADOBE, Flash Player 9, Jul. 2006, 51 pages.

Jackson, et al., "Subspace: Secure Cross-Domain Communication for Web Mashups", WWW 2007, May 8-12, 2007, 10 pages.

"PME: Properties, Methods and Events", Borland Software Corp., Sep. 10, 2002, pp. 1-6.

Homer, A., Components and web application architecture, Microsoft Corporation, retrieved Feb. 13, 2008 from http://technet.microsoft.com/en-us/library/bb727121(printer).aspx.

Google Inc., Google gadgets Developers Guide, Google Code, retrieved Feb. 13, 2008 from http://code.google.com/apis/gadgets/docs/dev_guide.html.

W3C, Document object model, Jan. 19, 2005, http://www.w3.org/DOM.

Flannagan, D., JavaScript: The definitive guide, Jan. 1997, http://www.unix.org.ua/orelly/web/jscript.

Kristol, D., L. Montulli, HTTP state management, The Internet Society, Oct. 2000.

Javascript speed test, jorendorff.com, retrieved Feb. 13, 2008 from http://www.jorendorff.com/articles/javascript/speed-test.html.

Microsoft Corp., Internet Explorer architecture, retrieved Feb. 13, 2008 from http://msdn2.microsoft.com/en-us/library/aa741312(printer).aspx.

Crockford, D., The <module> tag: A proposed solution to the mashup security problem, JSON, Oct. 30, 2006.

RFC 4627 on the application/json media type for JavaScript Object Notation (JSON), retrieved Feb. 13, 2008 from http://www.ietf.org/mail-archive/web/ietf-announce/current/msg02778.html.

James, Cross domain frame communication with fragment identifiers (for comet?), Tagneto, Jun. 6, 2006, http://tagneto.blogspot.com/2006/06/cross-domain-frame-communication-with.html.

Keukelaere, F. D., S. Bhola, M. Steiner, S. Chari, S. Yoshihama, SMash: Secure cross-domain mashups on unmodified browsers, retrieved Feb. 13, 2008 from http://domino.research.ibm.com/library/cyberdig.nsf/1e4115aea78b6e7c85256b360066f0d4/0ee2d79f8be461ce8525731b0009404d?OpenDocument.

Couvreur, J., Curiosity is bliss: FlashXMLHttpRequest: Cross-domain requests, Jun. 4, 2006.

Crockford, D., JSONRequest, JSON, Apr. 17, 2006, http://www.json.org/JSONRequest.html.

Hickson, I., HTML 5 Working Draft, Feb. 13, 2008, http://www.whatwg.org/specs/web-apps/current-work/#crossDocument.

EP Communication for Application No. 09733988.1-1856 / 2272003 PCT/US2009041169, Reference EP72271RK900aha, Apr. 3, 2013.

Liu, "Towards Service Composition Based on Mashup", IEEE Congress on Services, Jul. 1, 2007.

Guo, et al., "CompoWeb: A Component-Oriented Web Architecture", Retrieved at <<http://http://wwwconference.org/www2008/papers/pdf/p545-guo.pdf>>, WWW 2008, Apr. 21-25, 2008, Beijing, China, pp. 545-554.

Microsoft, "Windows Live Gadget Developer's Guide", Retrieved from the Internet via the Internet Archive at <<https://web.archive.org/web/20080108061208/http://microsoftgadgets.com/livesdk/docs/default.htm>>, Jan. 8, 2008, 12 pages.

"International Search Report and Written Opinion for PCT Application No. PCT/US2009/041169", Filed Date: Apr. 20, 2009, Mailed Date: Jan. 11, 2010, 11 pages.

* cited by examiner

FIG. 6

COMPONENT-ORIENTED ARCHITECTURE FOR WEB MASHUPS

BACKGROUND

There has been dramatic progress in Web applications in the past decade. Web pages have evolved from static HyperText Markup Language (HTML) documents using content from a single site to seamlessly integrating dynamic content (using client-side scripting) from a variety of different Web sites. These so-called Web mashups offer an enriched Web experience to users.

A Web mashup is a website or Web application that seamlessly combines content (such as data and code) from multiple sources (which may even be competing sources) into an integrated experience for a user. For examples a real estate website may combine map data from one website with housing data from another website to present an integrated view of housing prices at various locations on a map. Web mashups may also involve gadgets, which are Web components containing both HTML content and scripting code that can be placed on any page on the Web. Gadget aggregators (such as Microsoft® Windows Live) aggregate gadgets into a single page to provide a desirable, single-stop information presentation to their users.

In a Web mashup application, content from different sources is integrated together to achieve the desirable functionality. This can be compared to a desktop application built on top of binary components from different vendors. A component is a unit of program structure that encapsulates its implementation behind an interface used to communicate across the components. An interface abstracts a component's agreed services that it provides to others from its actual implementation, and thus enhances reusability. This component-oriented programming has established itself as the predominant software development methodology over the last decade. It breaks a system down into binary components for greater reusability, extensibility, and maintainability. Several component technologies, such as COM/DCOM, CORBA, Java Beans, and .NET, have been used widely to allow an application with interchangeable code modules. This promotes "black box reuse", which allows using an existing component without caring about its internals, as long as the component complies with some predefined set of interfaces. The component-oriented program paradigm, however, has not been used in Web applications and mashup systems.

Compared to the technologies used in desktop applications, Web applications still lag far behind. Although a Web page can combine content from different sources, the Web is still a monolithic architecture that does not support component-level abstraction. In other words, each functional part is glued statically at implementation time. Current Web standards and browsers allow scripting from other sources to be used and content from different sources to be aggregated, but the implementation is not separated from the services that the implementation provides. Moreover, features that are commonly used in component-oriented software development are not supported by current Web standards and browsers. For example, delayed binding and module interchangeability, which are widely used in component-oriented software development, are not supported by current Web standards and browsers.

Current Web standards and browsers use a binary trust model governed by a Same-Origin Policy (SOP), which prohibits documents or scripts of one origin from accessing documents or scripts of a different origin. Documents or scripts from the same origin can access each other without any restriction. SOP is used to protect against Cross Site Scripting (XSS) attacks. An origin consists of the domain name, protocol, and port. Two Web pages have the same origin if and only if their domain names, protocols, and the ports are identical. Each browser window, <frame>, or <iframe>, is a separate document. Each document is associated with an origin. A HTML document is accessed through the platform and language neutral interface Document Object Model (DOM). Programs and scripts can use DOM to dynamically access and update the content, structure, and style of documents. Scripts enclosed by <script> in a document are treated as libraries that can be downloaded from different domains, but run as the document's origin rather than the origin from which they are downloaded.

Another problem is that SOP presents Web mashup documents from different sources from interacting with each other, thus restricting the functionality that a mashup can deliver. To work around SOP, a proxy server can be used to aggregate the contents from different sources before sending to the client so that the mashup contents appear to be the same origin to the browser. However, one drawback of this approach is that the proxy server can be a bottleneck and unnecessary round trips are required.

Asynchronous JavaScript® and XML (AJAX) have been widely used to provide interactivity through client-side code with minimized impact on network and server performance. AJAX makes client-side mashups popular since client-side mashups reduce latency and bandwidth as compared to the proxy approach described above. A client-side mashup includes documents from various sites and makes them interact with each other at the client side. To circumvent SOP, a document in a client-side mashup includes scripts from the target sites in order to achieve cross-domain interactions. However, this requires the full trust of those sites since the included scripts have full access to the host document's resources. SOP's binary trust model forces Web programmers to make tradeoffs between security and functionality. Security is frequently sacrificed for functionality.

Web gadget aggregators enable a user to customize his or her portal page by selecting multiple third-party contents. Each content manifests as a gadget. A gadget in these applications is a separate frame, and SOP isolates one gadget from another as well as from the gadget aggregator. This severely restricts the functionality of a Web mashup. For example, a Web page may contain three gadgets from different origins: (1) a people gadget, which lists people; (2) a weather gadget, which shows a city's weather; and, (3) a map gadget, which shows a map. SOP prevents the weather and map gadgets from responding to a click on a person in the people gadget to show his home on the map gadget and the weather of his home on the weather gadget. To support this desired functionality, scripts from a different source need to be embedded with a full trust being granted.

New technologies have been proposed to offer client-side cross-domain communication mechanisms without sacrificing security. These technologies include cross-domain communications for Web mashups using a new type of <module> tag. This new <module> tag partitions a Web page into a collection of modules. A module is isolated except that JavaScript® Object Notation (JSON) formatted messages are allowed to communicate between a module and its parent document.

A similar scheme has been proposed for HTML 5 to provide cross-document communications, no matter whether documents belong to the same domain. Since documents are arranged in hierarchy structure, this proposal leverages the current abstraction of a document instead of proposing a new isolation abstraction like the <module>. One problem, however, is that though cross-domain communications are supported in this HTML 5 proposal, the communication receiver has to decide the trustiness of the sender by itself. This requires every component has its own access control system. Furthermore, DOM and JavaScript® resources are shared based on the same origin policy. Therefore, a separate domain per component is still required.

Adobe's Flash Player framework uses cross-domain policy files to configure and give the Flash Player permission to access data from a given domain without displaying a security dialog. Although this approach provides more flexibility and controls than standard SOP communication model, it depends on a configuration outside a browser, and the service provider cannot distinguish whether the requests originator comes from the same domain as the provider or not.

One technique has been proposed that provides a cross-domain communication mechanism without any browser plug-ins or client-side changes. This technique splits a site into sub-domains, using one of them to evaluate scripts from other domains, and another page to hold a notification object. Then the two sub-domain pages relax their domain to a common value to exchange information, and send information back via the held notification object. However, this technique is complex to use (especially for complex mashups), and may not work for certain domains. For example it is impossible to relax a domain (such as "a.com" or "192.168.0.1") to create a parallel domain to receive partially trusted information. Thus, this technique does not work in these cases.

Approaches to communicate between <iframe>s by using the fragment identifier of the frame URL have been proposed, Modification of the URL fragment identifier dose not reload the page, and can be observed by frames from different domain, thus can be used to transport messages between frames. However, such communication is limited to the size of fragment identifiers (for example, the maximum length of a URL in Internet Explorer is 2,083 characters), and can be overheard by other frames.

One technique uses a browser plug-in to provide a fine-grained access control on read, write, and traverse actions of the DOM tree of a Web application. In order to safely isolate the DOM sub-tree of each component, policies are associated with parts of the DOM tree inside a Web page, such as defining a policy that only the component and the event hub can access and modify a communication zone between them. One problem, however, is that this technique prevents innocent parts from accessing potentially malicious parts of the DOM tree.

Another technique (called MashupOS) proposes to add several new elements to HTML. Among them, <Sandbox> and <OpenSandbox> tags are designed to consume unauthorized content without liability and over trusting. The <ServiceInstance> tag creates an isolated region to hold related memory and network resources. A <ServiceInstance> may also hold multiple display area resources by possessing some <Friv> nodes in the HTML document tree. MashupOS also provides browser-side communication across domains. <ServiceInstance>s may declare ports to listen to communication requests. Such a request can be sent from any script block by using a CommRequest object provided by MashupOS. However, this technique lacks desirable features such as support of contract-based channels or an abstraction of contract-based channels to promote interchangeability among gadgets and separation of a gadget's implementation from its actual deployment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the component-oriented web mashup system and method use a component-oriented paradigm and apply it to Web mashup applications to facilitate secure Web mashups. While a traditional gadget in a Web mashup is a Web component that is a specialized application designed to be hosted in a Web page, embodiments of the component-oriented web mashup system and method redefine this traditional definition of gadget to mean a Web component having a contract-based channel that allows the gadget to communicate with others. The contract-based channel may be verifiable, and access to the contract-based channel by others may be controlled by the service provider. This so-called component-oriented Web (or CompoWeb) gadget is equivalent to a software component in the component-oriented programming paradigm.

CompoWeb gadgets use contract-based channels to communicate with each other. This means that a protocol of the communication channel between two CompoWeb gadgets is specified and contains a pre-defined specification. A contract-based channel may be verifiable and access to its communication channel may be controlled. The CompoWeb gadget can be queried to determine which interfaces have been implemented and the specifications of supported communication channels. The communication channel is also controlled, which means that access to the verifiable controlled communication channel can be regulated by the service provider. This service provider decides whether access to the communication channel is granted or denied.

Embodiments of the component-oriented web mashup system and method create and define gadgets using HTML and script. In order to make minimal modifications to convert a current Web page into a CompoWeb gadget-based Web page, and to allow a majority of a CompoWeb gadget's content to be rendered by legacy browsers that do not support CompoWeb gadgets, embodiments of the component-oriented web mashup system and method extend the current Web standards. In particular, a new HTML tags and global script objects and functions are defined and used. This extends the functions of the browser to enable the new functionality exhibited by embodiments of the component-oriented web mashup system and method.

Embodiments of the component-oriented web mashup system and method treat content of a CompoWeb gadget as a component that is isolated from other gadgets and frames by a browser. In effect, the CompoWeb gadget is a "black box" to other gadgets and frames. Only those CompoWeb gadgets allowed access to another CompoWeb gadget are able to use the exposed functionalities of the CompoWeb gadget through the contract-based communication channel, which may be verifiable and controlled. In addition, the scope of what a CompoWeb gadget exposes can be specified.

The calling of an exposed function is similar to existing function calls. However, one major difference is that if a first CompoWeb gadget calls a function of a second CompoWeb gadget, the function runs in the callee's environment (in other words, the second CompoWeb gadget's environment) rather than the caller's (in other words, the first CompoWeb gadget's) environment. This adds security, because all that the first CompoWeb gadget receives is the run result.

Some embodiments of the component-oriented web mashup system and method also include delayed binding of CompoWeb gadgets. With delayed binding, a CompoWeb gadget specifies the type of function or interface that it supports and what type of function or interface that it needs. When a gadget aggregator or web page is called, it groups certain CompoWeb gadgets together automatically. Binding of CompoWeb gadgets can be delayed such that the binding is performed at run time or delivery time, not at code development time.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of embodiments of the component-oriented web mashup system and method reference is made to the accompanying drawings, which form a part thereof, and in which is shown by way of illustration a specific example whereby embodiments of the component-oriented web mashup system and method may be practiced. It is to be understood that other embodiments may be utilized and structural changes may be made without departing from the scope of the claimed subject matter.

I. Concepts and Features of the Component-Oriented Web Architecture

Before providing an overview and then delving into the details of embodiments of the component-oriented web mashup system and method, the features and concepts used by embodiments of the system and method will be discussed.

I.A Features

A gadget (a CompoWeb gadget) in embodiments of the component-oriented web mashup system and method includes the following features. These features allow embodiments of the component-oriented web mashup system and method to attain much greater reusability, extensibility, and maintainability, and greatly improve security and reliability over existing techniques. These benefits can, in turn, lead to a shorter time to market, more robust and highly scalable applications, and lower development and long-term maintenance costs.

I.A.1 Encapsulation

The implementation details of a gadget in embodiments of the component-oriented web mashup system and method should be encapsulated. The actual data and code inside this gadget are hidden from others. A gadget in embodiments of the component-oriented web mashup system and method behaves like a black box to other gadgets and frames except the contract-based services that the gadget provides to others. This separation of implementation and contract-based services are highly desirable in Web applications.

I.A.2 Delayed Binding

When a gadget is implemented, the developer does not have to bind it to another gadget. An abstraction of supported and required contract channels is supported so that binding two gadgets together can be delayed until running time. This delayed binding offers flexibility in writing gadgets and gluing them together for a Web application.

I.A.3 Isolation of Running Environment

A gadget is an abstraction in Web applications such that no running state is shared between any two gadgets. Each gadget in embodiments of the component-oriented web mashup system and method runs in its own execution environment isolated from others. The only communications between two gadgets in embodiments of the component-oriented web mashup system and method are through the contract-based channels. This guarantees the security of a gadget at running time even if some gadgets come from untrusted sources, and avoids any interference from other poorly-implemented and crash-prone gadgets. Therefore security and reliability of the Web application are ensured.

I.A.4 Easy Adoption and Incremental Deployment

The design of gadget-level abstraction ensures easy adoption and allows incremental deployment. Embodiments of the component-oriented web mashup system and method are built on top of the existing Web standards and browser implementations with minimized changes. There is an easy way to provide a fallback mechanism for legacy browsers which do not support gadget-level abstraction without undesirable consequences.

I.B Concepts

Embodiments of the component-oriented web mashup system and method apply the component-oriented software programming paradigm to Web applications. Two key concepts are introduced by embodiments of the component-oriented web mashup system and method: a component-oriented Web (or CompoWeb) gadget and an interface. As stated above, a traditional gadget is a Web component that is a specialized application designed to perform certain functions and can be hosted in a Web page. This traditional gadget can be implemented in different ways, such as in iframes and DIVs. As used in this document, a "CompoWeb gadget" redefines this traditional definition of gadget to mean a Web component having a contract-based communication channel that allows the Web component to communicate with others through the channel. A protocol of the communication channel between two CompoWeb gadgets is specified and contains a pre-defined specification. This is in contrast to a communication channel that either pure data without any format or data in a general purpose format is communicated. Without a contract, both parties have to use some agreed upon way to understand the communicated data. A CompoWeb gadget is equivalent to a software component in the component-oriented programming paradigm. A software component is an element of a system that offers a service to and is able to communicate with other components.

A contract-based communication channel may be verifiable or access to it may be controlled by the service provider. "Verifiable" means that the protocol of the communication channel between two CompoWeb gadgets is specified and can be queried and enforced. The verifiable communication channel between CompoWeb gadgets has a pre-defined specification and can be queried to determine which communication protocols have been implemented and the specifications of supported communication channels.

"Controlled" means that access to the verifiable controlled communication channel can be regulated by the service provider who can decide if an access is granted or denied. Moreover, the service provider can decide who can see a communication channel. It is possible that some CompoWeb gadgets can see a communication channel while other CompoWeb gadgets cannot.

In its most general terms, an "interface" is a boundary across which two independent components communicate with each other. More specifically, as used in this specification, an "interface" is an abstraction of pre-defined, machine-queryable contract-based channels through which a CompoWeb gadget can communicate with others in a verifiable and controlled manner. Communication between CompoWeb gadgets is performed over a channel, which is either a unidirectional or a bi-directional connection between the two CompoWeb gadgets. The channel is specified by a contract, which specifies a format of messages and valid message sequences along the channel. This contract-based channel allows an isolated CompoWeb gadget to communicate with other CompoWeb gadgets and the communication channel is verifiable and controlled.

I.B.1 Brower-Isolated CompoWeb Gadget

Each CompoWeb gadget used by embodiments of the component-oriented web mashup system and method runs under a private environment isolated from other CompoWeb gadgets and frames by the browser. This ensures integrity and guarantees the confidentiality of the internal state of a CompoWeb gadget. Reliability is also improved since the running status of one CompoWeb gadget does not affect other CompoWeb gadgets.

The browser-isolated CompoWeb gadget can be thought of in terms of a software-isolated process (SIP) as used in the Singularity operating system by Microsoft®, which runs under a software isolated environment. For a client mashup application, a browser resembles a multi-user operating system. In particular, mutually distrusting Web sites interact programmatically in a single page on the client side and share the underlying browser resources for the browser, while mutually distrusting users share the host resources for the operating system.

Singularity offers the following three key features as compared to a traditional operating system. First, Singularity offers software-isolated processes (SIP) for protection of programs and system services. Second, Singularity offers contract-based channels for communications between two SIPs. Third, Singularity offers manifest-based programs for verification of system properties.

The component-oriented web mashup system and method commonalities with Singularity, in that a CompoWeb gadget resembles a Singularity SIP in that the CompoWeb a gadget runs in an environment isolated from other CompoWeb gadgets by a browser. In addition, in the component-oriented web mashup system and method, contract-based channels are the only way to communicate between two CompoWeb gadgets. This resembles contract-based channels to communicate between two SIPs. Moreover, a CompoWeb gadget can describe what contract-based channels it requires and supports, and is verifiable by a machine. This property is used by the component-oriented web mashup system and method to delay binding of a CompoWeb gadget with other CompoWeb gadgets until its deployment. A CompoWeb gadget is interchangeable with another one with the same required and supported contract-based channels. This resembles the Singularity's manifest which describes the program's dependencies and desired capabilities, and is machine-verifiable.

I.B.2 Safe Invocation

A CompoWeb gadget can invoke another CompoWeb gadget in the same way as if invoking a normal script object. This invoking is performed through a CompoWeb gadget's exposed member properties, methods and events (known as the PME model). Unlike invoking a normal function call that the invoked function logic runs in caller's context, the invoked member method of a CompoWeb gadget runs in its own context without interfering with a caller's context. The input arguments and the return values are exchanged between the caller and callee as pure data.

I.B.3 Delayed Binding Mechanism

This mechanism allows a CompoWeb gadget developer to declare dependencies on an abstraction of contract-based channels (or CompoWeb gadget interfaces) and write logic to collaborate with these channels. This occurs without statically binding to actual CompoWeb gadget instances. Binding with actual CompoWeb gadgets can be delayed until deployment, which means that embodiments of the component-oriented web mashup system and method support dynamic binding of CompoWeb gadgets.

II. Operational Overview

Figure 1:
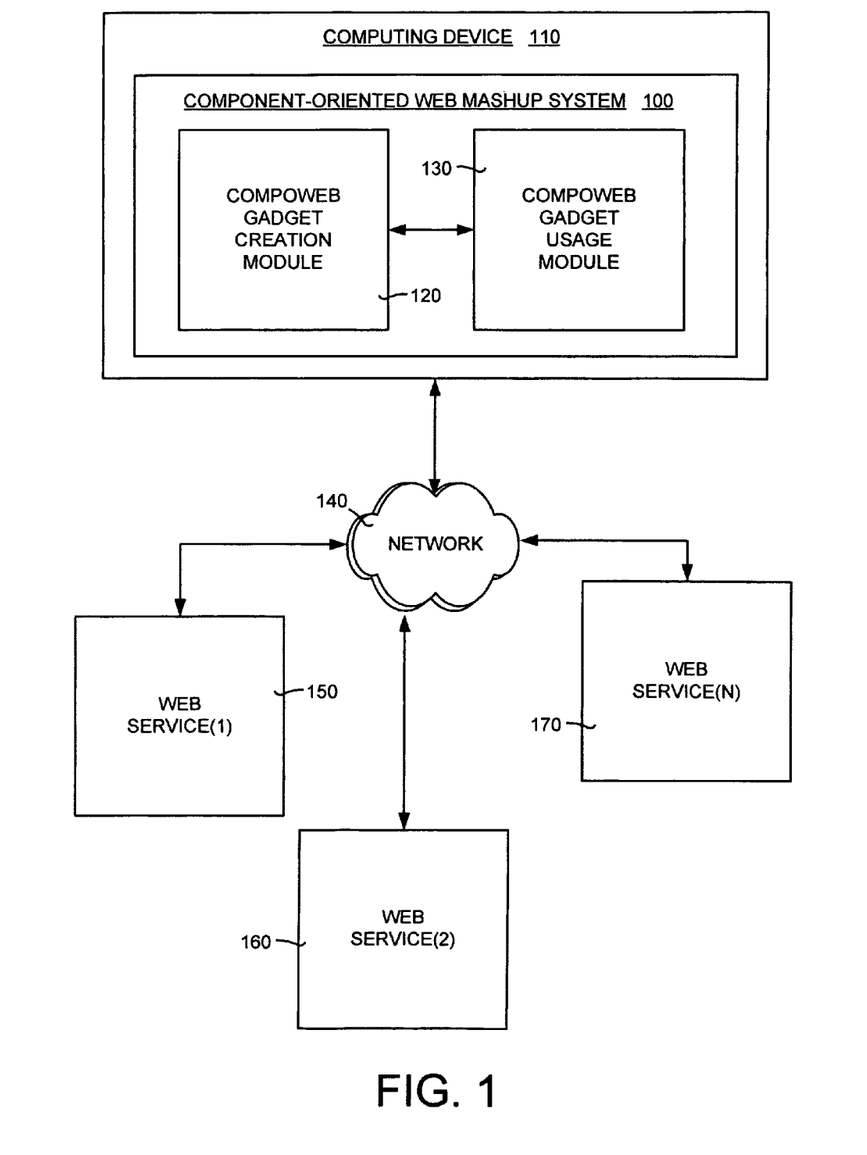
FIG. 1 is a block diagram illustrating a general overview of embodiments of the component-oriented web mashup system and method disclosed herein.

FIG. 1 is a block diagram illustrating a general overview of embodiments of the component-oriented web mashup system and method disclosed herein. It should be noted that the implementation shown in FIG. 1 is only one of many implementations that are possible. Referring to FIG. 1, embodiments of the component-oriented web mashup system 100 and method are shown implemented in a computing environment. This computing environment includes a computing device 110. It should be noted that computing device 110 may have a single processor (such as a desktop or laptop computer) or several processors.

In generals embodiments of the component-oriented web mashup system 100 and method create CompoWeb gadgets and use these CompoWeb gadgets to create secure Web mashups. Embodiments of the component-oriented web mashup system 100 allow secure communication between two CompoWeb gadgets to facilitate the Web mashup at a particular website having a browser. Embodiments of the component-oriented web mashup system 100 include a CompoWeb gadget creation module 120, which creates CompoWeb gadgets that are encapsulated in an isolated running environment, and a CompoWeb gadget usage module 130, which uses the created CompoWeb gadgets to provide a Web mashup.

Embodiments of the component-oriented web mashup system 100 obtain content from Web services over a network 140. As shown in FIG. 1, these Web services may include a first Web service 150 (Web service (1)), a second Web service 160 (Web service (2)), and up to an Nth Web service 170 (Web service (N)). Embodiments of the component-oriented web mashup system 100 obtain content from these Web services 150, 160, 170 over the network 140 and use this content and the CompoWeb gadgets to create a secure Web mashup.

Figure 2:
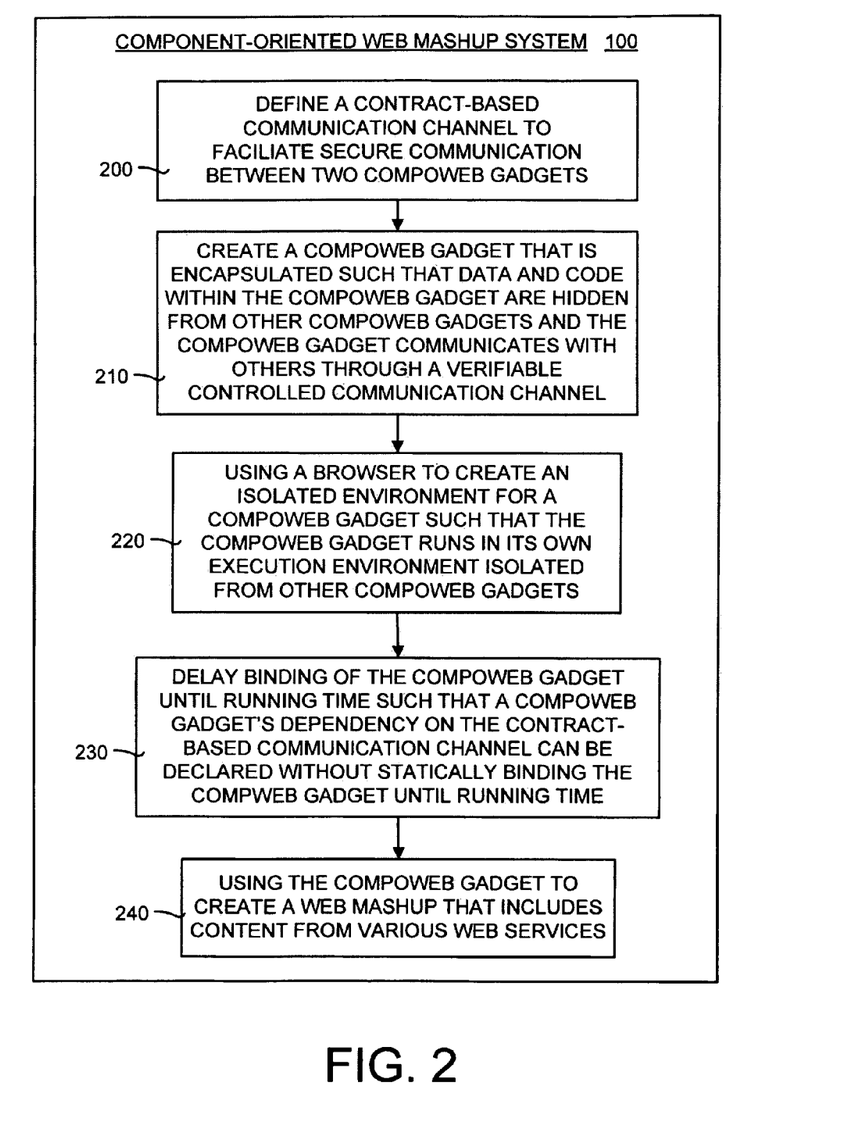
FIG. 2 is a flow diagram illustrating the general operation of embodiments of the component-oriented web mashup system shown in FIG. 1.

FIG. 2 is a flow diagram illustrating the general operation of embodiments of the component-oriented web mashup system 100 shown in FIG. 1. The operation begins by defining a contract-based communication channel (box 200). The contract-based communication channel may be verifiable and access to the channel may be controlled by the service provider. This contract-based communication channel facilitates secure communication between two CompoWeb gadgets. Next, an encapsulated CompoWeb gadget is created (box 210). The CompoWeb gadget is encapsulated such that data and code within the CompoWeb gadget are hidden from other CompoWeb gadgets and frames. The CompoWeb gadget can communicate with others through a verifiable controlled communication.

A browser of embodiments of the component-oriented web mashup system 100 then is used to create an isolated environment for the CompoWeb gadget (box 220). This isolated environment allows the CompoWeb gadget to run in its own execution environment such that the CompoWeb gadget is isolated from other CompoWeb gadgets and objects. Binding of the CompoWeb gadget can be delayed until running time (box 230). This means that the CompoWeb gadget's dependency on the contract-based communication channel can be declared without statically binding the CompoWeb gadget until running time, The CompoWeb gadget then is used to create a Web mashup that includes content from various Web services (box 240).

III. Operational Details

The details of the operation of embodiments of the component-oriented web mashup system and method will now be discussed.

III.A CompoWeb Gadget Creation

Figure 3:
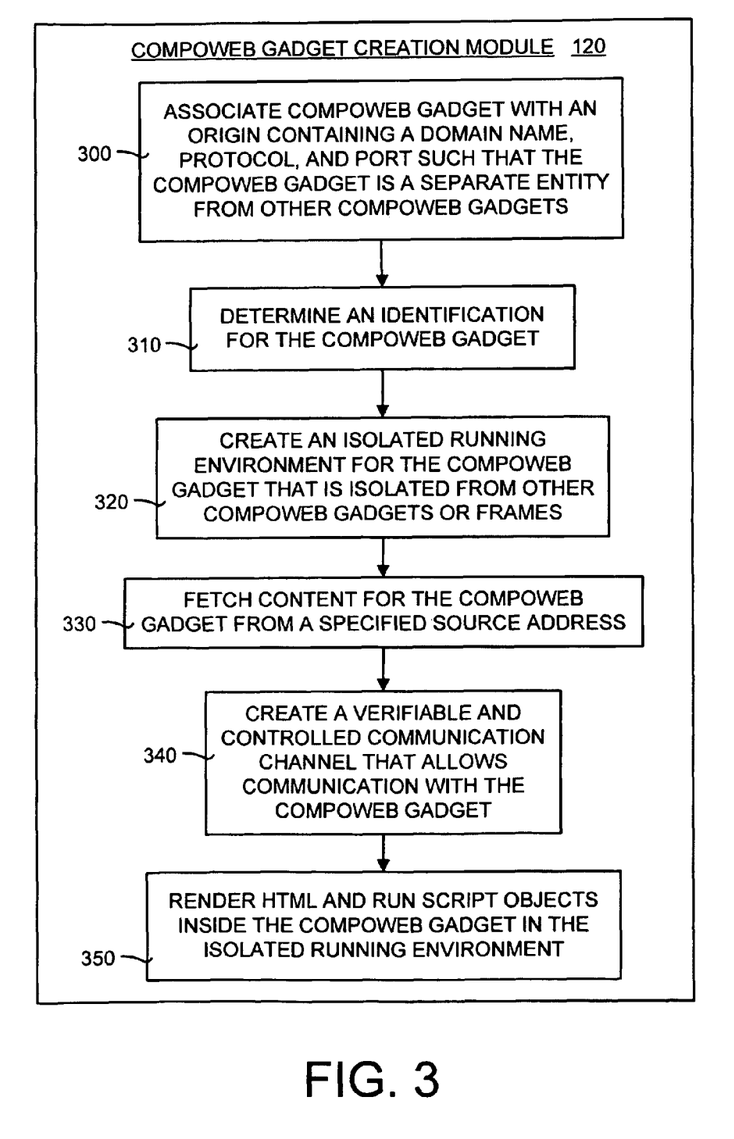
FIG. 3 is a flow diagram illustrating the details of the operation of the CompoWeb gadget creation module of embodiments of the component-oriented web mashup system shown in FIG. 1.

FIG. 3 is a flow diagram illustrating the details of the operation of the CompoWeb gadget creation module 120 of embodiments of the component-oriented web mashup system 100 shown in FIG. 1. CompoWeb gadget creation begins by associating the CompoWeb gadget with an origin (box 300). The origin contains a domain name, a protocol, and a port such that the CompoWeb gadget is a separate entity from other CompoWeb gadgets and frames. Next, an identification is determined for the CompoWeb gadget (box 310). Each CompoWeb gadget has a unique identifier within the context of the mashup Web page.

The module 120 uses the browser to create an isolated running environment for the CompoWeb gadget (box 320). This isolates the CompoWeb gadget from other CompoWeb gadgets or frames. Next, content is fetched for the CompoWeb gadget from a specified source address (box 330). A verifiable controlled communication channel is then created that allows communication with the CompoWeb gadget in a verifiable and controlled manner (box 340). HTML is then rendered and script objects are run inside the CompoWeb gadget in the isolated running environment (box 350).

Embodiments of the component-oriented web mashup system 100 and method create and define gadgets using HTML and script. Embodiments of the component-oriented web mashup system 100 and method seek to make minimal modifications to convert a current Web page into a CompoWeb gadget-based Web page. Moreover, embodiments of the component-oriented web mashup system 100 and method seek to allow a majority of a CompoWeb gadget's content to be rendered by legacy browsers that do not support CompoWeb gadgets.

Embodiments of the component-oriented web mashup system and method achieve the above by extending the current Web standards. In particular, a new HTML tag named <gadget> is added to define a CompoWeb gadget, and three new HTML meta types (namely, implementedInterfaces, internalUse, and usage) are added. Moreover, several global script objects and functions are defined and added by embodiments of the component-oriented web mashup system and method. These added terms now will be explained.

III.A.1 Added Terms that Extend Current HTML and Scripts

Figure 4:
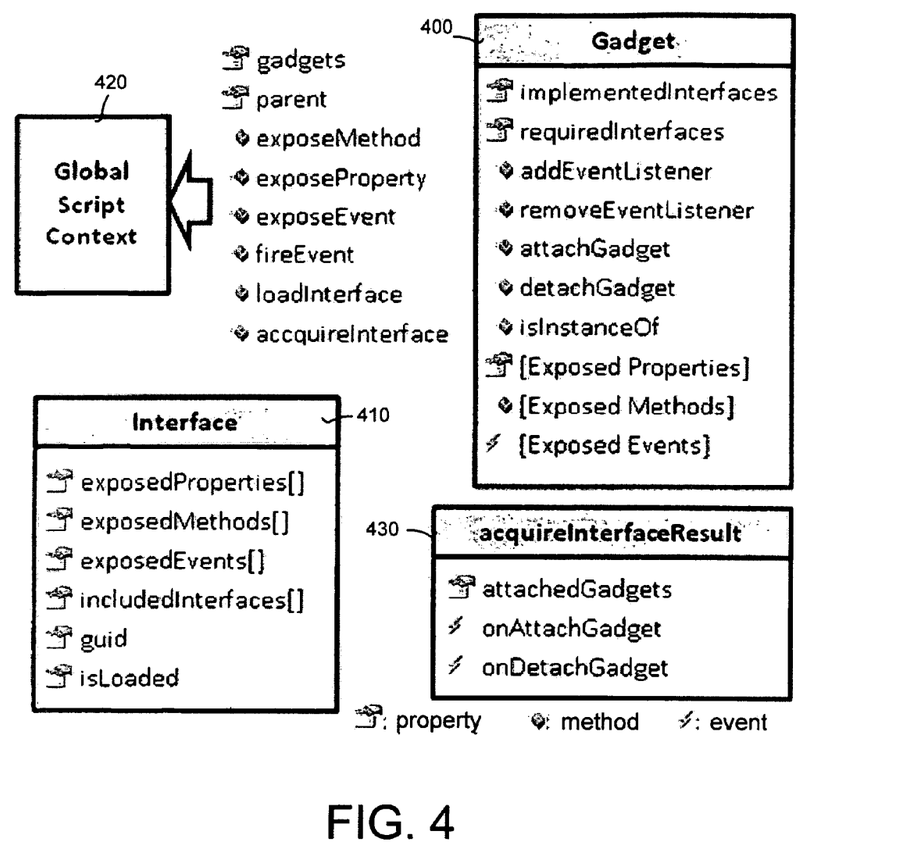
FIG. 4 is a block diagram illustrating added script terms and HMTL tags of embodiments of the component-oriented web mashup system shown in FIG. 1.

FIG. 4 is a block diagram illustrating added script terms and HMTL tags of embodiments of the component-oriented web mashup system 100 shown in FIG. 1. As shown in FIG. 4, the added scripts and HTML terms may be grouped into four broad categories: (1) CompoWeb gadget terms 400; (2) Interface terms 410; (3) Global Script context terms 420; and, (3) acquireInterfaceResult terms 430. The first category is CompoWeb gadget terms. These are intrinsic terms of a CompoWeb gadget. An implementedInterfaces term is a property that discloses which interfaces have been implemented by a CompoWeb gadget. A requiredInterfaces term is a property that is use to determine what type of interface other CompoWeb gadgets require. An addEventListener term is a method that adds a listener to an event of the CompoWeb gadget. A removeEventListener term is a method that removes a listener to an event of the CompoWeb gadget. An attachGadget term is a method that binds together two CompoWeb gadgets, while a detachGadget term is a method that detaches two CompoWeb gadgets. An isInstanceOf term is method that checks whether a CompoWeb gadget has implemented a certain interface. An Exposed Properties term is a list of exposed properties of a CompoWeb gadget. An Exposed Methods term is a list of exposed methods of a CompoWeb gadget. An Exposed Events term is a list of exposed events of a CompoWeb gadget.

The second category is Interface terms. These are intrinsic terms of a CompoWeb interface, and every interface object has these properties. In particular, an exposedProperties term is a property that discloses the properties of a specified CompoWeb interface. An exposedMethods term is a property that discloses the methods of a specified CompoWeb interface. An exposedEvents term is a property that discloses the events of a specified CompoWeb interface. An includedInterfaces term is a property that lists the included interfaces of a specified CompoWeb interface. A global unique identifier (guid) term is a property that lists the identifier of a specified CompoWeb interface. For each interface there is a unique guid. An isLoaded term is a property that indicates whether a specified CompoWeb interface has been successfully loaded.

The third category is Global Script context terms. These are global script terms that relate globally to the CompoWeb gadget. In particular, a gadgets term is a property that returns a list of all child CompoWeb gadgets of the current CompoWeb gadget. A parent term is a property that returns the parent of a CompoWeb gadget. An exposeMethod term is a method that discloses a method of a CompoWeb gadget. An exposeProperty term is a method that discloses a property of a CompoWeb gadget. An exposeEvent term is a method that discloses an event of a CompoWeb gadget. A fireEvent term is a method that triggers a specified event in a CompoWeb gadget. A loadInterface term is a method that loads an interface from a URL and turns it into a CompoWeb interface object. An acquireInterface term is a method that declares what type of an interface the current CompoWeb gadget requires from other CompoWeb gadgets to complete its logic.

The fourth category is acquireInterfaceResult terms. These are intrinsic terms of a return value of the acquireInterface term. Specifically, an attachedGadgets term is a property that declares which CompoWeb gadgets are attached to a specified interface. An on AttachGadget term is an event that fires when a CompoWeb gadget is attached to a specified interface. An on DetachGadget term is an event that fires when a CompoWeb gadget is detached from a specified interface.

Embodiments of the component-oriented web mashup system and method also include certain HTML extensions. One extension is a new HTML tag named <gadget>. This HTML tag can be used to identify a CompoWeb gadget and its properties. Moreover, embodiments of the component-oriented web mashup system and method include three new HTML metatypes. A first HTML metatype is implementedInterfaces, which is used to determine which type of interfaces the CompoWeb gadget has implemented. A second HTML metatype is internalUse. This term indicates whether the CompoWeb gadget is for internal use only. If the CompoWeb gadget is for internal use only, this means that only a CompoWeb gadget from the same origin can access (both see and call) the exposed property, method, and events (PME). CompoWeb gadgets from a different domain cannot access the exposed PME of another CompoWeb gadget from a different origin. A third HTML metatype is usage. This term indicates the usage of the CompoWeb gadget. The details of usage are described below.

III.A.2 CompoWeb Gadget Creation Examples

In this section, examples of a CompoWeb gadget creation will be set forth. In this example, a CompoWeb gadget with an ID of "alice_news" is defined as follows:

<gadget src="http://alice.com/news.htm" id="alice_news" width="400" height="300">

This definition is similar to that of a frame. Similar to a frame, each CompoWeb gadget is associated with an origin. In addition, it is possible for CompoWeb gadgets to be nested such that a CompoWeb gadget can have children CompoWeb gadgets. When the above CompoWeb gadget is instantiated, the browser creates an isolated running environment, fetches the content from a specified source address http://alice.com/news.htm, processes the DOM objects, and runs the script objects inside the CompoWeb gadget in a private space isolated from other CompoWeb gadgets or frames.

For each source HTML file that implements a CompoWeb gadget, the following <meta> tag is used to explicitly declare that the content is a CompoWeb gadget:

<meta name="usage" content="gadget"/>

This statement tells a browser that the source HTML file intends to be only a CompoWeb gadget. When a CompoWeb gadget file is embedded in an <iframe> or <frame> tag, a browser still ensures that the HTML file behaves as a CompoWeb gadget in a frame rather than a frame. This is to ensure that only the exposed members can be accessed by others from the same origin.

Persistent state of a CompoWeb gadget is stored in cookies, which are handled in the same way as existing browsers. A cookie is accessible by the Web pages of the same directory as or subdirectories of the Web page which created the cookie. Therefore, two CompoWeb gadgets can share the persistent data in a cookie if and only if their sources can be relaxed to be the same domain and path.

Embodiments of the component-oriented web mashup system and method isolate the running environment of a CompoWeb gadget except its persistent state does not compromise any security in practice. This is because the additional access specification of a cookie (such as the path) can be used to isolate the persistent state of a CompoWeb gadget if necessary. This is achieved by placing the creating Web page of the cookie (which is typically the CompoWeb gadget itself) in a unique directory such that no other Web page or CompoWeb gadget resides in that directory or its subdirectories except the CompoWeb gadget itself. It should be noted that a CompoWeb gadget does not use SOP to govern accessibility. Gadgets from the same origin can access only the exposed members of another gadget. This guarantees the security of a cookie.

There are several differences between a CompoWeb gadget and a frame. Full or no trust governs the accessibility of a frame. In other words, a frame's internal document trees and scripts are fully accessible by other frames or gadgets from the same origin, but are not accessible at all if from different origins. In contrast, SOP is not applicable to govern accessibility of a CompoWeb gadget. A CompoWeb gadget is not accessible by other CompoWeb gadgets or frames except through its exposed contract-based channels. It does not matter whether those CompoWeb gadgets or frames are from the same origin. Thus, as compared to a frame, a CompoWeb gadget has a much finer access control.

III.B CompoWeb Gadget Usage and Features

Figure 5:
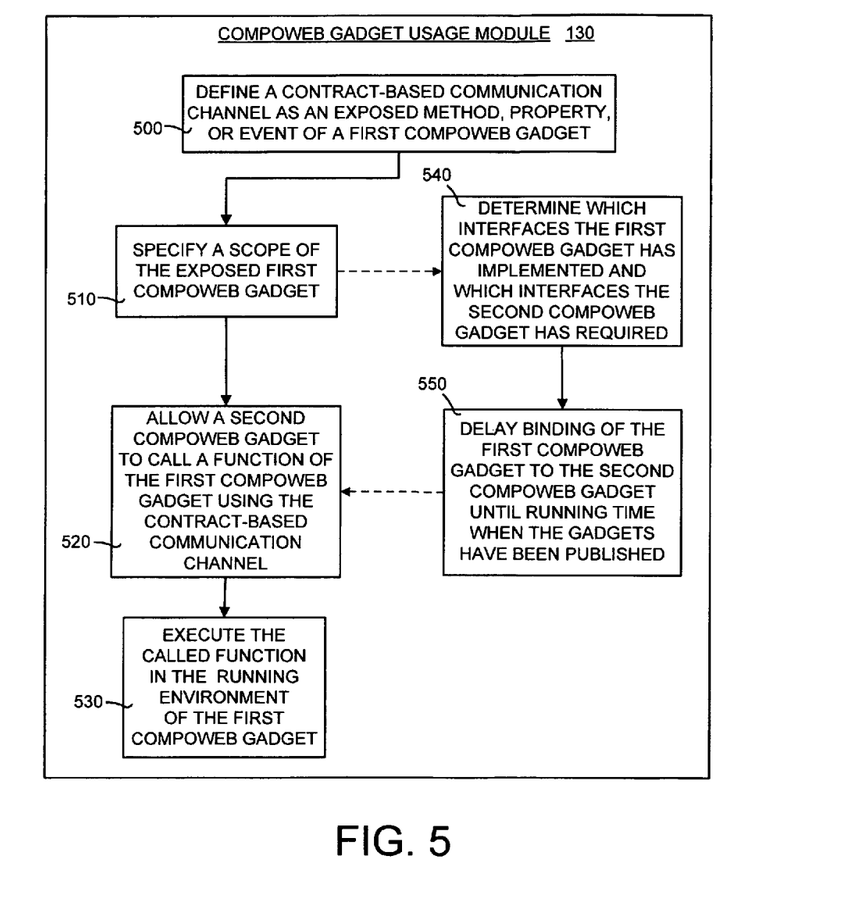
FIG. 5 is a flow diagram illustrating the details of the operation of the CompoWeb gadget usage module of embodiments of the component-oriented web mashup system shown in FIG. 1.

FIG. 5 is a flow diagram illustrating the details of the operation of the CompoWeb gadget usage module 130 of embodiments of the component-oriented web mashup system 100 shown in FIG. 1. The operation begins by defining a contract-based communication channel as an exposed method, property, or event of a first CompoWeb gadget (box 500). A scope of the exposed first CompoWeb gadget then is specified (box 510).

Next, the module 130 allows a second CompoWeb gadget to call a function of the first CompoWeb gadget using the contract-based communication channel (box 520). The called function then is executed in the running environment of the first CompoWeb gadget that received the call for the function (box 530). The module 130 also determines which interfaces the first CompoWeb gadget has implemented and which interfaces the second CompoWeb gadget has required (box 540). Binding of the first CompoWeb gadget to the second CompoWeb gadget is delayed until running time when the gadgets have been published (box 550).

Embodiments of the component-oriented web mashup system 100 and method use several features that make the CompoWeb gadget unique. These features and their usage now will be discussed.

III.B.1 Encapsulation

As mentioned above, a CompoWeb gadget appears as a black box to other CompoWeb gadgets except the contract-based channels it supports. A contract-based channel is an exposed member method, property, or event. The three extended global script functions (exposeMethod, exposeProperty, and exposeEvent) can be used to define a communication contract with a member method, property, and event, respectively. For example, the source of a map gadget may contain the following code to expose a method named "setLocation" for other CompoWeb gadgets to show a specific location on the map gadget:

```
function setLocation(loc) {
    innerMapControl.goto(loc);
    return innerMapControl.getCenter( );
}
exposeMethod('setLocation');
```

Another CompoWeb gadget can manipulate the map gadget through the exposed member method to set the map gadget to display a location such as Beijing:

//NOTE: 'map 1' is the id of the map gadget.
    var newLocation=map1.setLocation('Beijing'), These few lines of code can fulfill the function to let the map gadget to show on the map the home of the person clicked in a people gadget.

Although the above code for the CompoWeb gadget looks exactly the same as a normal script function call in syntax, they have a fundamental difference with implication in security. In the above call, the caller CompoWeb gadget marshals the input arguments (i.e. 'Beijing') to the map gadget. The function logic then is executed in callee's context. At the end of the execution, the result is marshaled back to the caller. The exposeMethod term exposes only the name of the method (or method name), rather than the method script. This is very different from calling a normal script function, where the called function logic is executed in the caller's context.

This difference of running in different contexts has a great impact on security. As mentioned previously, calling a script function from an untrusted origin has security implications. Many XSS attacks have exploited this method to launch successful attacks. In contrast, the same syntax is basically secure to use when it is applied to CompoWeb gadgets. When CompoWeb gadget A calls a method exposed by CompoWeb gadget B, CompoWeb gadget A is secure since the called function logic is executed in CompoWeb gadget B's context. Of course, CompoWeb gadget A should be cautious about the returned result, which should be checked and validated before use. CompoWeb gadget B is also secure when its member function is called by another, possibly untrusted, gadget since the function logic of its member function is executed in its own context. Moreover, CompoWeb gadget B's internal state keeps isolated during the function call.

A CompoWeb gadget can also expose its property. In some embodiments of the component-oriented web mashup system and method, a property is exposed as follows:

```
function get_Name( ) {
    return ...;
}
function set_Name(value) {
    ...
}
exposeProperty('Name', 'get_Name', 'set_Name');
```

The first argument in exposeProperty is the name of the exposed property, the second and third arguments of exposeProperty are the getter method and setter method, respectively. It should be noted that the last two arguments are optional. When omitted, the default names are used. The default names for the getter and setter methods are the property name prefixed with "get_" and "set_", respectively.

Reading or writing a CompoWeb gadget's property is just like reading or writing an object's field (such as gadgetId.Name='Alice'), which then is translated to calling getter or setter method. This results in a higher level of encapsulation. CompoWeb gadgets can also provide notifications about an occurrence of a specific event to other objects, such as a successful completion of a method. Events are exposed with exposeEvent and triggered with fireEvent, as follows:

```
exposeEvent('CalcCompleted');
function calc( ) {
    ...
    fireEvent('CalcCompleted', result);
}
```

A CompoWeb gadget can register or unregister handlers to another CompoWeb gadget's event notifications with addEventListener and removeEventListener. These two methods are fixed member methods of every CompoWeb gadget. For example, CompoWeb gadget A can register or unregister a handler "someScriptMethod" to CompoWeb gadget B as follows:

B.addListener('CalcCompleted', someScriptMethod);
B.removeListener('CalcCompleted', someScriptMethod);

It is possible that multiple CompoWeb gadgets respond to a single event. This is done easily by registering their handlers to the event. When an event fires, the associated handlers are called. Embodiments of the component-oriented web mashup system and method guarantee that a handler registered to respond to an event of a CompoWeb gadget cannot be accessed by the CompoWeb gadget that fires the event. This is achieved as follows. A browser maintains a list of handlers responding to an event, When an event is fired, the browser executes all the handlers registered to respond to the event. As a result, a CompoWeb gadget can register private member method as a handler to respond to an event of another CompoWeb gadget without sacrificing security. Like method calls, a handler runs in the context of the CompoWeb gadget which registers the handler to respond to an event. A handler does not run in the context of the CompoWeb gadget which fires the event.

The event mechanism described above can be used to deliver rich Web experience easily. For example, it is desired to have a map gadget and a weather gadget to respond to a click of a person in a people gadget to show the location and the weather of the home of the person being clicked, the following two lines of code can be written to realize the functionality:

list.addEventListener('locationChanged', map.setLocation);
list.addEventListener('locationChanged', weather.queryByLocation);

III. B.2 Scope of Exposed Members

Embodiments of the component-oriented web mashup system and method, by default, specify that an exposed member is visible and callable by any CompoWeb gadget. Such an exposed member is said to be of global scope. Global scope may be undesirable in some cases. A CompoWeb gadget may want to restrict an exposed member to be viewable and accessible by a specific CompoWeb gadget or group of CompoWeb gadgets. This is supported by embodiments of the component-oriented web mashup system and method, but only at the granularity of an origin. Two levels of scopes are supported by embodiments of the component-oriented web mashup system and method: (1) the global scope; and, (2) Same Origin Scope (SOS). When a CompoWeb gadget is of SOS, its exposed members can be viewed and called only by the CompoWeb gadgets of the same origin. The CompoWeb gadget seems to have exposed nothing to CompoWeb gadgets of a different origin.

Embodiments of the component-oriented web mashup system and method allow two ways to specify the scope of gadget. A first method is to specify in the source file of a CompoWeb gadget. In some embodiments, the syntax is:

<meta name="internalUse" content="true|false"/>

When internalUse is set to true, the CompoWeb gadget's scope is SOS. Otherwise the scope is global, If internalUse is not specified, the default scope is applied. In some embodiments of the component-oriented web mashup system and method the default scope is the global scope.

A second method to specify a CompoWeb gadget's scope is within the gadget HTML tag:

<gadget . . . internalUse="true|false"/>

Like the first method, the default value is false (the global scope). The two methods in specifying a CompoWeb gadget's scope have different effects. If the scope is specified inside the source code of a CompoWeb gadget, any instance of the CompoWeb gadget is of the same origin scope. If the scope is specified inside the gadget HTML tag, only the instance of the CompoWeb gadget specified by the gadget HTML tag is of that scope. Another instance of the same CompoWeb gadget specified by another CompoWeb gadget's gadget HTML tag may have a different scope. In some embodiments of the component-oriented web mashup system and method, if the scope of a CompoWeb gadget is specified more than once (such as once inside the source code) and another inside the gadget HTML tag, then the narrower scope prevails.

III.B.3 Interfaces

An interface is an abstraction of pre-defined, machine-queryable contract-based channels through which a CompoWeb gadget can communicate with others in a verifiable and controlled manner. Embodiments of the component-oriented web mashup system and method utilize an XML-based file format to define an interface. An interface defines a set of names for exposed properties, methods, and events. By way of example, an IMap interface can be defined as follows:

```
<?xml version="1.0" encoding="utf-8"?>
<interface GUID="FCB5ED82-F243-44fc-974D-A56248DB20AA">
    <exposedProperty name="Center" />
    <exposedMethod name="SearchLocation" />
    <exposedEvent name="LocationChanged" />
</interface>
```

Every interface has associated with a unique GUID to prevent conflict of exposed names in difference interfaces.

A CompoWeb gadget is said to have implemented an interface if both of the following two conditions are met:
1. the CompoWeb gadget has implemented all the members declared in the interface definition; and
2. the CompoWeb gadget has declared that it has implemented the interface. Declaring implementation of an interface has implicitly exposed all the members specified in the interface. Therefore, a CompoWeb gadget does not need to declare each exposed member already defined in an interface declared to be implemented by the CompoWeb gadget.

Some embodiments of the component-oriented web mashup system and method have a CompoWeb gadget use the following syntax to declare that it has implemented an interface:
    <meta name="implementedInterfaces" content=interfaceList/>

Each element in the interfaceList declares an implemented interface, which specifies a URL where the interface is defined. Moreover, an optional hash of the interface definition file calculated at the implementation phase can also be defined. This calculation can be done with a developing tool. The hash value helps a browser to verify whether the interface definition has been modified after the CompoWeb gadget is deployed. The hash value should be provided when a CompoWeb gadget developer does not fully trust the host of the interface definition. Otherwise a malicious host may be able to expose a private member of a CompoWeb gadget by adding the name of the private member in the interface definition after the CompoWeb gadget is deployed. Since the CompoWeb gadget has declared that it has implemented the interface, this implicitly exposes all the members specified in the interface. Such a modification would result in exposing the private function that the CompoWeb gadget developer has no intention to expose, which is a potential security loophole. A browser would produce an error message if an interface does not match its hash value included in a CompoWeb gadget that implements the interface.

A user can verify if a specific CompoWeb gadget has implemented a specific interface by using the CompoWeb gadget member method named isInstanceOf, which is a fixed member method of every CompoWeb gadget:
    var flag=gadgetName.isInstanceOf(interfaceURL);
Some embodiments of the component-oriented web mashup system and method allow users to define an interface by reusing and extending an existing interface. For example, this can be done as follows:

```
<?xml version="1.0" encoding="utf-8"?>
<interface GUID="AAE65ED4-1152-4050-8F45-CEDEC50D3ABB">
    <!--including IMap interface-->
    <include src="http://interfaces.com/imap.xml" />
    ...
</interface>
```

If a CompoWeb gadget has implemented the outer interface, it should have also implemented the included interfaces (such as the IMap interface in the above example). When the hash value of the outer interface is calculated at the implementation phase of a CompoWeb gadget, the included interfaces are expanded and then the hash value of the expanded file is calculated. Similarly, declaring implementation of the outer interface implicitly declares implementation of the included interface.

III.B.4 Delayed Bin

Embodiments of the component-oriented web mashup system and method allow a CompoWeb to explicitly declare its interest to communicate with other CompoWeb gadgets that have implemented a certain interface (such as the IMap interface). This is accomplished by calling the extended global function named acquireInterface inside the CompoWeb gadget. One example of this is as follows:
    var imap=acquireInterface('http://interfaces.com/imap.xml');
The acquireInterface function declares that the CompoWeb gadget depends on a contract-based channel specified by the interface. Moreover, the returned value of this function can be used to access late bound CompoWeb gadgets that have implemented the specified interface and are attached to the CompoWeb gadget to fulfill the specific required interface declared in this function.

The declared requirement of dependency is met when a suitable CompoWeb gadget is attached to the requirement submitter. By way of example, assume that the requirement submitter is CompoWeb gadget A, and the suitable CompoWeb gadget is CompoWeb gadget B:
    //B has implemented the interface imap.xml
    A. attachGadget(B);
"Suitable" means that CompoWeb gadget B has implemented the interface acquired by CompoWeb gadget A earlier, and "attach" means that CompoWeb gadget A can collaborate with CompoWeb gadget B through the acquired interface.

Such declarations enable an aggregator to bind CompoWeb gadgets, such as binding CompoWeb gadget A, which, for example, wants the IMap interface to complete its logic with CompoWeb gadget B, which has implemented the iMap interface. This occurs without the aggregator knowing the meaning of the IMap interface or functionaries of the CompoWeb gadgets A and B. Such a binding does not require any modification of either CompoWeb gadget A or CompoWeb gadget B, and can be done when the CompoWeb gadgets A and B have already been published. Embodiments of the component-oriented web mashup system and method also allow a CompoWeb gadget to decide through scripts and configure files whether and how to connect with CompoWeb gadgets that are recommended by the aggregator and implement the required interface.

The function of acquireInterface always returns an acquireInterfaceResult object that has three members, as discussed above. The first member, attachedGadgets, is a gadget array that stores the "suitable" and attached gadgets. The second member, onAttachGadget, is an event that is fired after attachedGadgets inserts a new element. The third member, onDetachGadget, is also an event. This third member gets fired after an element in attachedGadgets is detached. A CompoWeb gadget may communicate with its attached partners by accessing the attachedGadgets member of the acquireInterface result. By way of example, this code may be written as follows:

```
/*below code will call setLocation on all attached IMap instances */
if (imap.attachGadgets.length > 0) {
    for (i = 0; i< map.attachGadgets.length; i++)
        map.attachGadgets[i].setLocation('Beijing');
}
```

One of a CompoWeb gadget's fixed members, the requiredInterfaces property, stores all the interface requirements of the CompoWeb gadget. This property gets updated after every invocation of acquireInterface. Two CompoWeb gadgets are able to examine each other's dependency requirements via their requiredInterfaces members.

For an aggregator CompoWeb gadget, it is possible to "auto-connect" its children gadgets by inspecting and mapping their requiredInterfaces and implementedInterfaces. For example, this may be done as follows:

```
//Note: assume 'g1' and 'g2' are two gadget objects
If (g1.implementedInterfaces intersects with g2.requiredInterfaces)
{
    g2.attachGadget(g1);
};
```

Such an auto-connection script helps the aggregator bind matched CompoWeb gadgets together. When there is more than one possible way to bind, scripts and configure files can be used to choose a binding, as explained above.

III.B.5 Incremental Deployment

Incremental deployment is critical in adopting a new technology. This is because it is impossible to replace overnight existing browsers with those that support embodiments of the component-oriented web mashup system and method. To accommodate this deployment, embodiments of the component-oriented web mashup system and method should ensure that there will be no undesirable effect or interaction between embodiments of the component-oriented web mashup system and method and an unsupporting legacy browser. Moreover, it is desirable that Web developers have a safe fallback mechanism to deal with the case that extended HTML tags and script functions of embodiments of the component-oriented web mashup system and method are not recognized or supported by a legacy browser.

Some embodiments of the component-oriented web mashup system and method allow a safe fallback to be implemented as follows. First, a "Not Supported" notification is added as the inner text to every gadget HTML tag. This is achieved as follows:

```
<gadget id="..." src="...">
    CompoWeb gadgets are not supported by your browser.
</gadget>
```

This message is ignored by browsers that support embodiments of the component-oriented web mashup system and method but are rendered as plain text by legacy browsers. In addition, some embodiments of the component-oriented web mashup system and method have exploited the fact that a legacy browser ignores any unrecognized tags.

Second, some embodiments of the component-oriented web mashup system and method examine script blocks and embrace every occurrence of CompoWeb extended functions and objects into a conditional statement block. The conditional statement checks whether embodiments of the component-oriented web mashup system and method are currently supported. This is achieved by examining whether some of the extended functions in embodiments of the component-oriented web mashup system and method are defined. For example, this can be performed as follows:

```
if (acquireInterface && exposeMethod)
{
    //code using CompoWeb functions and objects
}
```

In this manner, the script engine in a legacy browser will not be interrupted by functions and objects present in embodiments of the component-oriented web mashup system and method.

IV. Exemplary Operating Environment

Embodiments of the component-oriented web mashup system 100 and method are designed to operate in a computing environment. The following discussion is intended to provide a brief, general description of a suitable computing environment in which embodiments of the component-oriented web mashup system 100 and method may be implemented.

Figure 6:
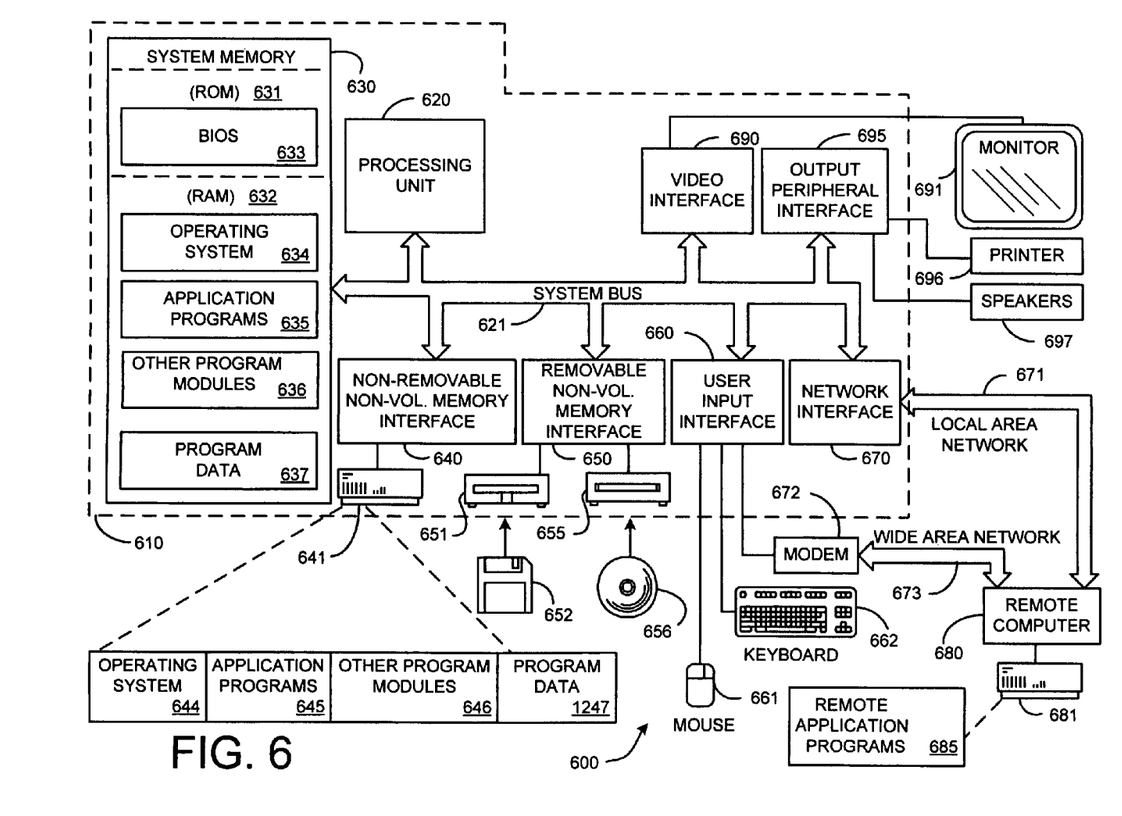
FIG. 6 illustrates an example of a suitable computing system environment in which embodiments of the component-oriented web mashup system and method shown in FIGS. 1-5 may be implemented.

FIG. 6 illustrates an example of a suitable computing system environment in which embodiments of the component-oriented web mashup system and method shown in FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment.

Embodiments of the component-oriented web mashup system 100 and method are operational with numerous other general purpose or special purpose computing system environments or configurations. Examples of well known computing systems, environments, and/or configurations that may be suitable for use with embodiments of the component-oriented web mashup system 100 and method include, but are not limited to, personal computers, server computers, handheld (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the component-oriented web mashup system 100 and method may be described in the general context of computer-executable instructions, such as program modules, being executed by a computer. Generally, program modules include routines, programs, objects, components, data structures, etc., that perform particular tasks or implement particular abstract data types. Embodiments of the component-oriented web mashup system 100 and method may also be practiced in distributed computing environments where tasks are performed by remote processing devices that are linked through a communications network. In a distributed computing environment, program modules may be located in both local and remote computer storage media including memory storage devices. With reference to FIG. 6, an exemplary system for embodiments of the component-oriented web mashup system 100 and method includes a general-purpose computing device in the form of a computer 610 (the computing device 110 is an example of the computer 610).

Components of the computer 610 may include, but are not limited to, a processing unit 620 (such as a central processing unit, CPU), a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer readable media. Computer readable media can be any available media that can be accessed by the computer 610 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 610. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 640 includes computer storage media in the form of volatile and/or nonvolatile memory such as read only memory (ROM) 631 and random access memory (RAM) 632. A basic input/output system 633 (BIOS), containing the basic routines that help to transfer information between elements within the computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information (or data) into the computer 610 through input devices such as a keyboard 662, pointing device 661, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 620 through a user input interface 660 that is coupled to the system bus 621, but may be connected by other interface and bus structures, such as, for example, a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism, In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method performed by at least one computer processing unit, the method comprising:
    obtaining multiple gadgets for a web application;
    determining that a first gadget of the multiple gadgets has a dependency on an interface, the interface specifying an exposed method;
    evaluating other gadgets of the multiple gadgets to determine whether the other gadgets implement the interface on which the first gadget has the dependency, wherein the evaluating provides a determination that a second gadget of the multiple gadgets implements the interface;
    responsive to the determination that the second gadget implements the interface on which the first gadget has the dependency, binding the first gadget to the second gadget in the web application; and
    executing the web application by:
        executing the first gadget in a first execution environment, wherein the first gadget encapsulates first data and first code within the first gadget that are hidden from the second gadget, and
        executing the second gadget in a second execution environment that is isolated from the first execution environment, wherein the second gadget encapsulates second data and second code within the second gadget that are hidden from the first gadget,
    wherein the second gadget executes the exposed method of the interface in the second execution environment responsive to a request from the first gadget executing in the first execution environment.

2. The method of claim 1, further comprising:
    determining that the first gadget has another dependency on another interface that specifies another exposed method, wherein a third gadget implements the another interface; and
    binding the first gadget to the third gadget in the web application.

3. The method of claim 1, further comprising:
    determining that the first gadget has an accessible scope that is limited to gadgets sharing an origin with the first gadget; and
    preventing a third gadget that does not share the origin with the first gadget from accessing the exposed method of the first gadget.

4. The method of claim 1, further comprising:
    fetching at least some of the first data from a first source address specified by the first gadget; and
    fetching at least some of the second data from a second source address specified by the second gadget.

5. The method of claim 1, wherein the interface also specifies an exposed property having an associated method to retrieve a value of the exposed property and another associated method to set the value of the exposed property.

6. The method of claim 5, wherein at least some gadgets other than the second gadget also implement the interface by providing the exposed method, the exposed property, the associated method to retrieve the value of the exposed property, and the another associated method to set the value of the exposed property.

7. The method of claim 1, wherein the interface specifies multiple different exposed methods that are executed by the second gadget in the second execution environment.

8. A computing system comprising:
    at least one processing unit; and
    at least one computer readable media storing computer readable instructions which, when executed by the at least one processing unit, cause the at least one processing unit to:
        obtain multiple web components for a web application, the multiple gadgets web components encapsulating corresponding content including code and data;
        determine that a first web component of the multiple web components has a dependency on an interface, the interface specifying an exposed property;
        evaluate other web components for the web application to determine whether the other web components implement the interface on which the first web component has the dependency, wherein evaluation of a second web component of the multiple web components reveals that the second web component implements the interface;
        responsive to the evaluation revealing that the second web component implements the interface on which the first web component has the dependency, bind the first web component to the second web component in the web application; and
        execute the web application having the second component bound to the first component using separate isolated execution environments for at least some of the multiple web components, the separate isolated execution environments including at least a first isolated execution environment for the first web component and a second isolated execution environment for the second web component,
    wherein the second gadget requests to set a value of the exposed property of the first gadget while executing in the second isolated execution environment, and
    wherein the first gadget sets the value of the exposed property while executing in the first isolated execution environment.

9. The computing system of claim 8, wherein the interface specifies that any web component implementing the interface provides both a getter method to retrieve the value of the exposed property and a setter method to set the value of the exposed property.

10. The computing system of claim 9, wherein the second web component requests to set the value of the exposed property by calling the setter method.

11. The computing system of claim 8, wherein the first gadget comprises a global unique identifier (quid) of the interface.

12. The computing system of claim 8, wherein the web application is a web mashup and the computer readable instructions cause the at least one processing unit to:
display the web mashup including first content provided by the first web component and second content provided by the second web component.

13. The computing system of claim 12, wherein the first web component is associated with a first domain from which the first content of the web mashup is retrieved and the second web component is associated with a second domain from which the second content of the web mashup is retrieved.

14. The computing system of claim 13, wherein the computer readable instructions cause the at least one processing unit to:
determine that a third web component of the web mashup has same origin scope and is associated with a third domain that is different than the second domain with which the second web component is associated; and
prevent the second web component from calling a function implemented by the third web component while allowing a fourth component of the web mashup that is also associated with the third domain to call the function.

15. A computing system comprising:
at least one processing unit; and
at least one computer readable storage media storing computer readable instructions which, when executed by the at least one processing unit, cause the at least one processing unit to:
obtain multiple web components, the multiple web components including at least a first web component encapsulating first data and first code and a second web component encapsulating second data and second code; and
execute a web application comprising the multiple web components by:
providing separate isolated execution environments for the multiple web components, the separate isolated execution environments including at least a first isolated execution environment for the first web component and a second isolated execution environment for the second web component,
receiving a request to register an event handler method of the first web component to respond to an event fired by the second web component;
determining that the second web component has fired the event while executing within the second isolated execution environment, and
causing the first web component to execute the event handler method within the first isolated execution environment responsive to the event being fired by the second web component.

16. The computing system of claim 15, wherein the event comprises a user input identifying a location to the second web component.

17. The computing system of claim 16, wherein the computer readable instructions cause the at least one processing unit to:
provide, to the event handler method of the first web component, the location identified to the second web component by the user input.

18. The computing system of claim 15, wherein the computer readable instructions cause the at least one processing unit to:
receive another request to unregister the event handler method of the first web component from the event fired by the second web component; and
unregister the event handler method of the first web component so that the event handler method does not execute when the second web component fires the event again.

19. The computing system of claim 15, wherein the computer readable instructions comprise a web browser that notifies the event handler method of the first web component when the second web component fires the event.

20. The computing system of claim 15, wherein the computer readable instructions cause the at least one processing unit to:
determine that the first web component has a dependency on an interface, the interface specifying that any web component implementing the interface exposes the event;
evaluating other gadgets to determine whether the other gadgets implement the interface by exposing the event, wherein the evaluating provides a determination that the second gadget implements the interface and at least one of the other gadgets does not implement the interface; and
responsive to the determination that the second gadget implements the interface on which the first gadget has the dependency, binding the first gadget to the second gadget in the web application.

* * * * *